United States Patent [19]
Kogure

[11] Patent Number: 5,717,385
[45] Date of Patent: Feb. 10, 1998

[54] FIELD BUS SYSTEM AND VIRTUAL FIELD APPARATUS

[75] Inventor: Makoto Kogure, Katsuta, Japan

[73] Assignee: Hitachi, Ltd., Tokyo, Japan

[21] Appl. No.: 369,299

[22] Filed: Jan. 6, 1995

Related U.S. Application Data

[63] Continuation of Ser. No. 798,941, Nov. 27, 1991, abandoned.

[30] Foreign Application Priority Data

Nov. 28, 1990 [JP] Japan ..................... 2-322849

[51] Int. Cl.$^6$ .................................................. G05B 23/02
[52] U.S. Cl. ........................... 340/825.07; 340/825.54; 340/370.16
[58] Field of Search .................. 340/825.07, 825.54, 340/870.11, 870.13, 870.16, 870.39, 310 A, 310 R, 310 CP, 310.02, 310.08, 87.39; 364/600; 166/53

[56] References Cited

U.S. PATENT DOCUMENTS

| | | | |
|---|---|---|---|
| 3,827,029 | 7/1974 | Schlotterer et al. | 364/231 |
| 4,841,296 | 6/1989 | Kadoya et al. | 340/870.39 |
| 4,989,671 | 2/1991 | Lamp | 166/53 |
| 5,063,371 | 11/1991 | Oyer et al. | 340/825.54 |
| 5,153,462 | 10/1992 | Agrawal et al. | 364/600 |

FOREIGN PATENT DOCUMENTS

| | | |
|---|---|---|
| A5848198 | 3/1983 | Japan. |
| 59-201535 | 11/1984 | Japan. |
| A-1-116897 | 8/1989 | Japan. |
| A-2-208799 | 8/1990 | Japan. |
| A-2-254599 | 10/1990 | Japan. |

*Primary Examiner*—Michael Horabik
*Assistant Examiner*—Edward Merz
*Attorney, Agent, or Firm*—Antonelli, Terry, Stout, & Kraus, LLP

[57] ABSTRACT

In a system for performing signal transmission, through a field bus, between field devices and higher-rank apparatuses connected on a transmission line, the field devices are of the analog signal type. A substitution device is provided between the analog type field devices and the field bus. The substitution device acts to perform communication on the field bus as a substitute for the field devices. By the substitution device, the field devices can be gradually changed to those adapted to the field bus as occasion demands, so that an existing system can be transformed step by step into a field bus system.

9 Claims, 4 Drawing Sheets

FIELD BUS SYSTEM AND VIRTUAL FIELD APPARATUS

This application is a continuation of application Ser. No. 07/798,941, filed on Nov. 27, 1991 now abandoned.

BACKGROUND OF THE INVENTION

The present invention relates to field apparatuses for performing signal transmission on a two-wire transmission line, and, particularly, it relates to a field bus system in which system transformation and system extension into such a field bus can be made easily.

So-called field apparatuses are generally used so that the field devices measure physical quantities, such as a pressure, a temperature, a flow rate, and the like, in various kinds of plants, convert the measured values of such physical quantities into electric signals, and transmit the electric signals to higher-rank apparatuses. Further, the field devices alternatively may be used so that the field devices receive control signals transmitted from the higher-rank apparatuses to thereby control valves or the like in the plants.

In the case where the electric signals are analog signals, the transmission of those electric signals is standardized so that analog current signals of 4 to 20 mA are transmitted between the field devices and the higher-rank apparatuses. In general, communication between the field devices and the higher-rank apparatuses is one-way communication with analog signals.

In recent years, however, field devices with built-in microprocessors have been developed and put into practice with the advance of the semiconductor integration technique (IC technique). According to such field devices, not only one-way communication with analog signals can be performed on the transmission line but also two-way communication with digital signals can be performed on the transmission line, so that range setting, self diagnosis, etc., of the field devices can be remotely instructed. Such apparatuses of the type as mentioned above are disclosed in Japanese Patent Unexamined Publication Nos. Sho-58-48198 and Sho-59-201535.

A typical example of this type of device will be described hereunder with reference to FIG. 4. FIG. 4 shows an example of the configuration of analog current output type field devices which require an external power supply. Field devices 1a, 1b and 1c are operated by electric power supplied from an external power supply 4 and respectively output analog current signals so that the field devices 1a, 1b and 1c serve as constant current sources for sending currents corresponding to measured physical quantities onto the transmission line. A higher-rank receiver apparatus 3 detects a potential difference across each of a plurality of resistors inserted in series in the transmission line to thereby receive the analog current signals (hereinafter simply called "analog signals") flowing in the resistors. The analog signals thus received are used as instruction values of the respective field device 1a, 1b and 1c. A higher-rank communication apparatus 2 is connected between the set of the field device 1a, 1b and 1c and the use of the higher-rank apparatus 3 and the external power supply 4 so as to perform two-way communication between the field devices 1a, 1b and 1c and the higher-rank apparatus 3 with digital signals.

As a system for signal transmission on such a transmission line, known are a signal transmission system in which a digital signal is superposed on an analog signal for the purpose of performing communication with the digital signal without influence on the analog signal, a signal transmission system in which an analog signal and a digital signal are switched over each other, and a signal transmission system in which only a digital signal is used.

Recently, a field bus system has been proposed as a system in which a plurality of field devices are connected on one transmission line to perform two-way communication only with digital signals. A typical example of the field bus system will be described hereunder with reference to FIG. 5. FIG. 5 shows an example of the configuration of a system in which a plurality of field devices are connected, in the form of a tree, to higher-rank apparatuses through a transmission line. Field device 1a', 1b' and 1c' are operated by electric power supplied from an external power supply 4', so that two-way communication between the field devices and the higher-rank apparatuses are successively performed with digital signals on a transmission line 5' for the double purpose of transmitting measured physical quantities and receiving control quantities. A higher-rank communication apparatus 2' is connected between a set of the field device 1a', 1b' and 1c' and a set of the higher-rank apparatus 3' and the external power supply 4' and performs two-way communication between the field device 1a', 1b' and 1c' and the higher-rank apparatus 3' with digital signals. Terminators 7, each of which is composed of a resistor and a capacitor connected in series, are arranged across the ends of the transmission line 5'.

In the case where the system of FIG. 4 is transformed into the system of FIG. 5, it is necessary to replace the higher-rank apparatuses and the field devices by new ones adapted to the field bus. It is however said that system transformation can be made easily because the transmission line 5 can be used with no change, and also system expansion can be made easily because the number of field devices connected on the transmission line can be increased.

In the aforementioned conventional techniques, all apparatus except the transmission line must be once changed when an existing system is transformed into a field bus system.

In the case where such a field bus system is to be used, therefore, a problem arises in that equipment at the beginning is extremely expensive. In particular, it is impossible to gradually transform an existing system into a field bus system while field devices connected in the existing system are used as they are temporarily, and therefore the high cost of equipment at the beginning cannot be avoided. As a result, from the point of view of cost performance, it is difficult to apply the conventional techniques to such an existing system.

SUMMARY OF THE INVENTION

A first object of the present invention is therefore to provide a field bus system in which it is possible to transform a system of field devices not adapted to a field bus gradually into the field bus system.

A second object of the present invention is to provide a virtual field apparatus by which a field bus system can be used while an existing system not adapted to a field bus is kept to be used.

To attain the foregoing objects, according to the present invention, a substitution means is provided between a field bus and a plurality of field devices not adapted to the field bus so that the substitution means acts as a substitute for the field devices to perform communication on the field bus. By the substitution means, the field devices can be gradually changed to those adapted to the field bus as occasion demands, so that transformation from an existing system into a field bus system can be attained step by step.

Further, the present invention, newly provides a virtual field apparatus. The virtual field apparatus is provided with a connection terminal for the field bus and a plurality of analog signal connection terminals for the existing field devices, and has a function so that the virtual field apparatus acts to perform signal processing, between the connection terminal and the analog signal connection terminals, in place of the existing field devices on the field bus. Accordingly, system transformation so as to be adapted to the field bus can be made easily by connecting the virtual field apparatus to a known system.

The field bus system according to the present invention is directly connected to the transmission line, but the existing field devices not adapted to the field bus is indirectly connected to the transmission line through the newly provided field device acting as a substitute for the existing field devices. As a result, information including electric power for operating the existing field device not adapted to the field bus is supplied from the transmission line to the existing field device through the newly provided field device according to the present invention. When, for example, the existing field devices are of the analog signal current output type, analog current signals of 4 to 20 mA as the output signals thereof are converted into digital signals in the newly provided field device according to the present invention and transmitted virtually. When, on the contrary, the existing field devices are of the analog current input type, analog current signals of 4 to 20 mA as the input signals thereof are received in the newly provided field device according to the present invention virtually so that digital signals are converted into analog signals to be outputted from the newly provided field device.

By using the newly provided field apparatus, the existing system can be transformed into a field bus system while the existing analog signal type field devices are kept used. In short, a field bus system can be attained simply by changing the higher-rank apparatus and the external power supply into new ones adapted to the field bus.

Further, the existing field devices can be exchanged to new ones adapted to the field bus simply by changing the connection thereof into direct connection from the transmission line. Accordingly, system transformation from the existing system into the field bus system can be made easily step by step as occasion demands.

DESCRIPTION OF THE PREFERRED EMBODIMENTS

An embodiment of the present invention will be described hereunder with reference to the drawings.

Figure 1:
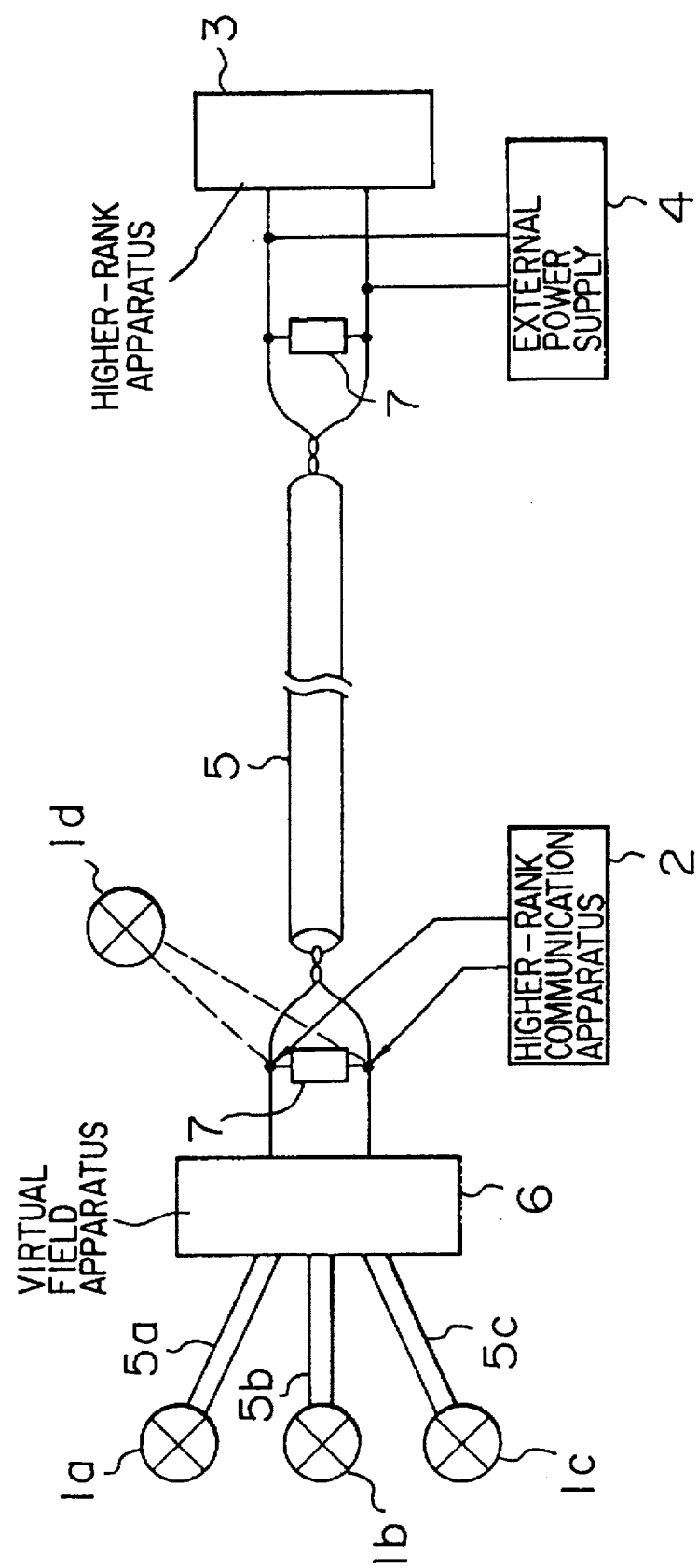
FIG. 1 is a view showing the configuration of an embodiment of the field bus system according to the present invention.

FIG. 1 is a view showing the configuration of a field bus system according to the present invention.

In FIG. 1, in field devices 1a, 1b and 1c, the output signals (or input signals) thereof are analog current signals of 4 to 20 mA or analog current signals of 4 to 20 mA on which digital signals are superimposed so that two-way communication can be performed, whereby the field devices 1a, 1b and 1c serve to transmit detection values obtained by measuring physical quantities, such as a pressure, a temperature, a flow rate, etc., in a process in each of various kinds of plants or serve to receive control quantities for controlling valves or the line in the plant. A virtual field apparatus 6 is operated with electric power supplied from an external power supply 4 through a transmission line 5 and is disposed between the transmission line 5 and the field devices 1a, 1b and 1c. Although this embodiment shows the case where the virtual field apparatus 6 is disposed in a field-side junction box, the invention can be applied to the case where the virtual field apparatus is disposed in a higher-rank apparatus side.

The virtual field apparatus 6 supplies electric power to the field devices 1a, 1b and 1c through the transmission lines 5a, 5b and 5c respectively, and the virtual field apparatus receives analog output signals from the field devices 1a, 1b and 1c also through the transmission lines 5a, 5b and 5c respectively. The virtual field apparatus 6 converts the analog output signals into digital signals and virtually uses the digital signals as output signals from the respective field devices to perform communication on the field bus system. When, for example, the field devices 1a, 1b and 1c are of the type of two-way communication by use of the analog current signals and the digital signals superimposed one on the other, the virtual field apparatus 6 has a function of communication protocol conversion between the field bus and the field devices 1a, 1b and 1c so that communication between the virtual field apparatus 6 and each of the field devices 1a, 1b and 1c can be performed not only by use of the analog signals but by use of the digital signals, through the transmission lines 5a, 5b and 5c, respectively. When, for example, the field devices 1a, 1b and 1c are of the type of performing communication only with the analog current signals, the virtual field apparatus 6 acts as a substitute for the field devices 1a, 1b and 1c virtually with respect to the field bus. When, for example, system alteration/expansion is made by modifying the field device into one adapted to the field bus or newly providing a field device adapted to the field bus, a field device 1d adapted to the field bus is connected on the field bus transmission line 5 so that electric power for operating the field device 1d can be directly supplied from the external power supply 4 to the field device 1d through the transmission line 5, and so that the field device 1d can perform communication with apparatuses (a higher-rank apparatus 3, a higher-rank communication apparatus 2, etc.) connected on the field bus. Here, the electric power consumed by the virtual field apparatus 6 includes electric power consumed by the internal circuits of the virtual field apparatus 6 and electric power consumed by the field devices 1a, 1b and 1c. Accordingly, the value of electric power supplied from the external electric source 4 through the transmission line 5 is little influenced by addition of the field device 1d adapted to the field bus, if the electric power consumed by the virtual field apparatus 6 can be controlled in the case where, for example, the field device 1c or the like is disconnected from the system.

The higher-rank apparatus 3 performs communication with the apparatuses (the virtual field apparatus 6, the field device 1d, the higher-rank communication apparatus 2, etc.) adapted to the field bus by use of digital signals through the transmission line 5, so that the higher-rank apparatus 3 receives various kinds of physical quantities (such as a pressure, a temperature, a flow rate, etc.) measured by the field devices or transmits control signals to the field devices such as valves or the like, as plant control information.

The higher-rank communication apparatus 2 can be connected in a desired position on the transmission line. The higher-rank communication apparatus 2 performs communication through the transmission line 5 while operating a display or a keyboard to thereby execute monitoring, adjusting and the like, of the output values from the virtual field apparatus 6 and the field device 1d.

Figure 2:
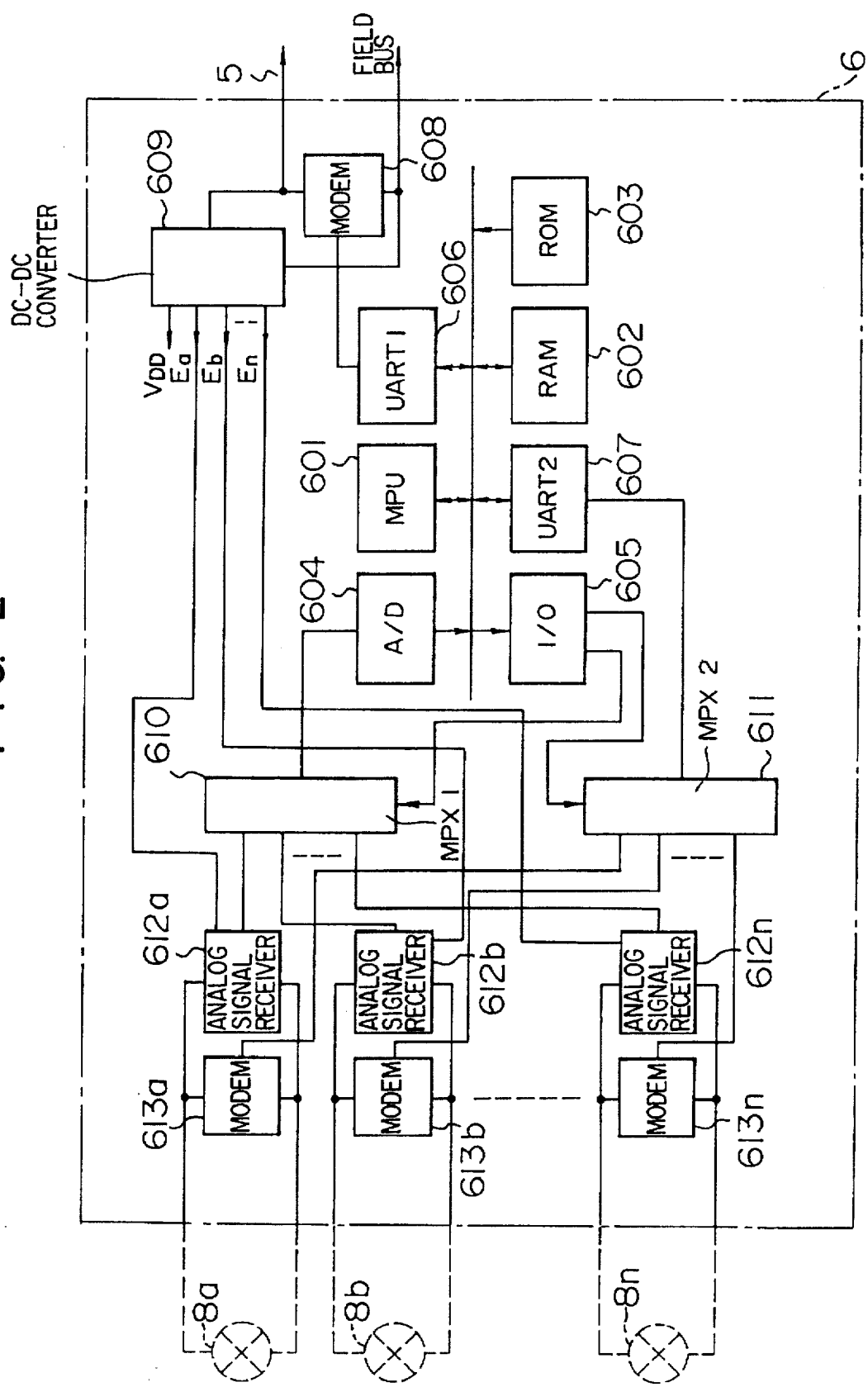
FIG. 2 is a block diagram showing an embodiment of the virtual field apparatus according to the invention.
Figure 3:
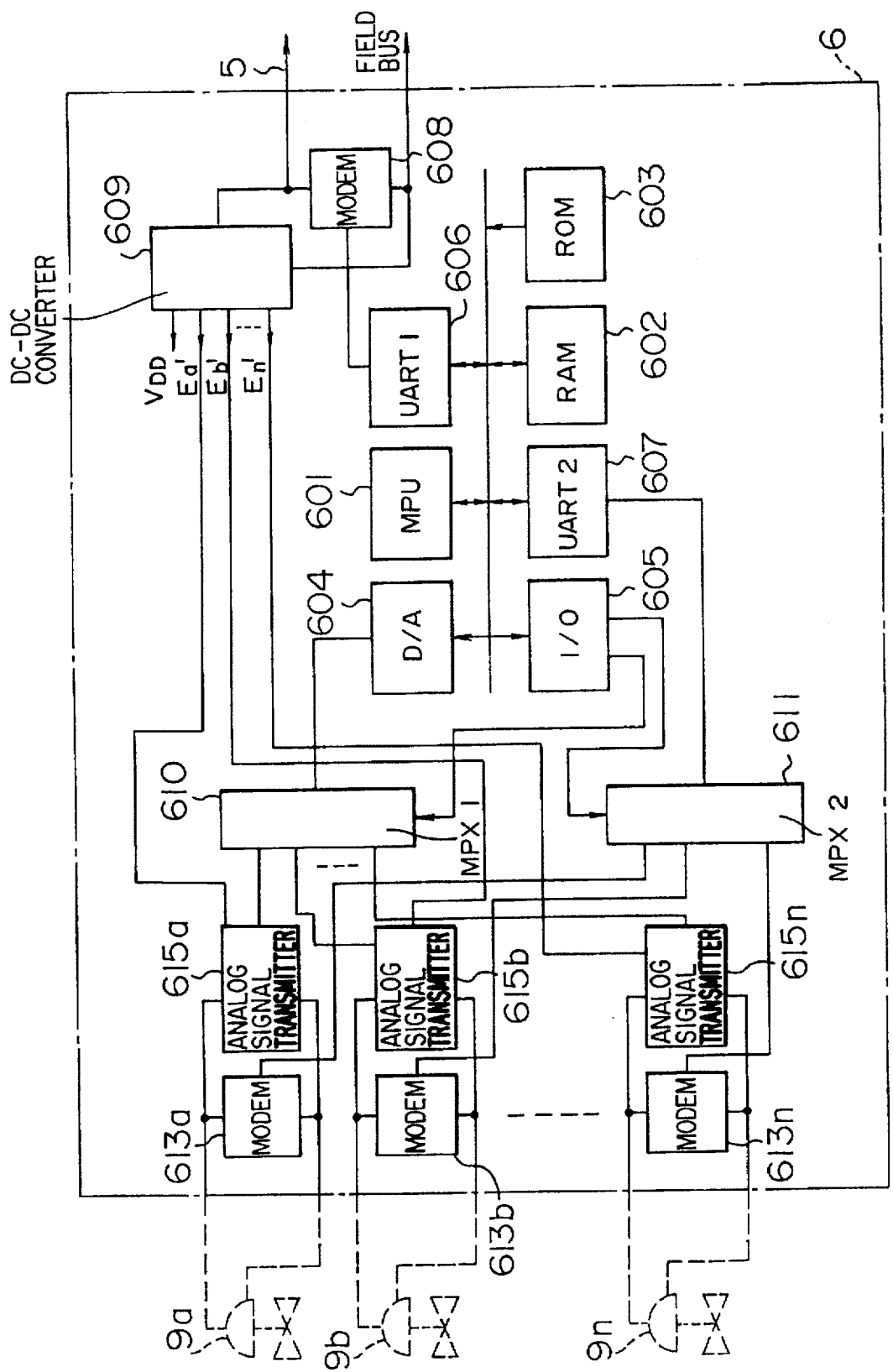
FIG. 3 is a block diagram showing another embodiment of the virtual field apparatus according to the invention.
Figure 4:
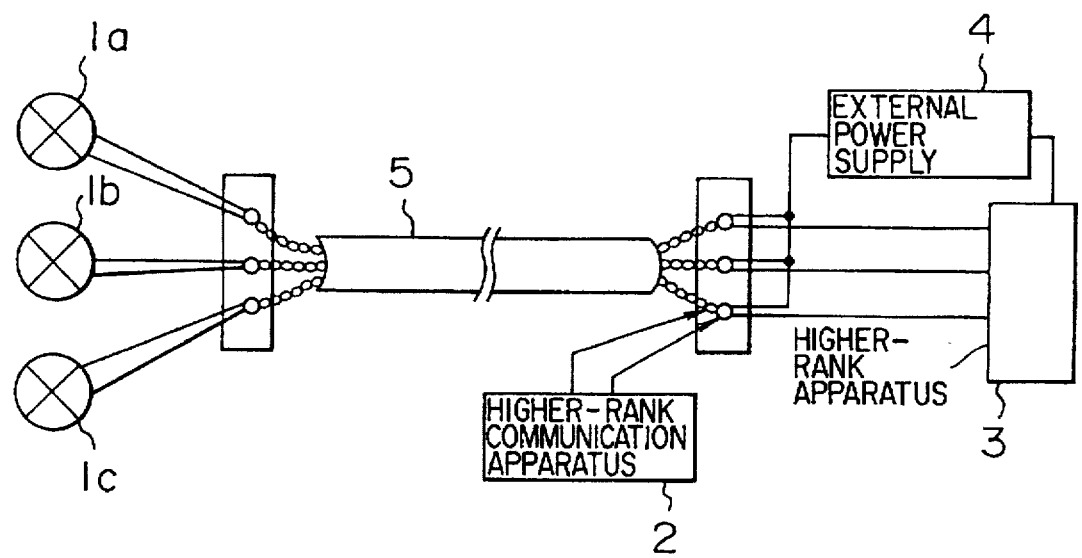
FIG. 4 is view showing an example of the system configuration of a conventional field device.
Figure 5:
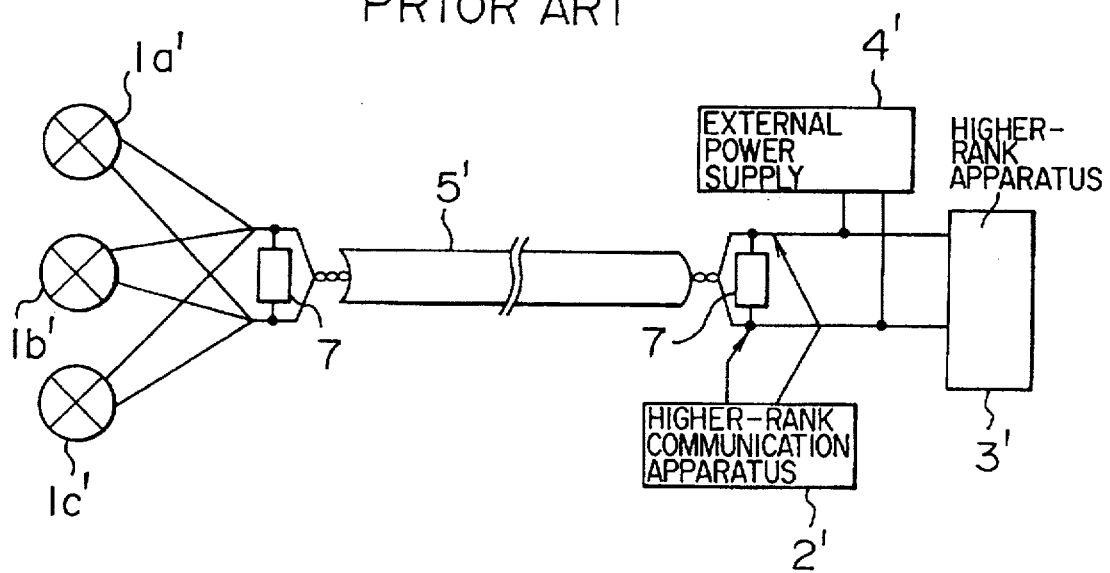
FIG. 5 is a view showing an example of a conventional field bus system.

The operation of the field apparatus 6 will be described hereunder more in detail with reference to FIGS. 2 and 3. FIG. 2 shows an example in which existing field devices 8a to 8n to be connected are of the type of analog signal outputs and of the type of two-way communication by using digital signals. FIG. 3 shows an example in which existing field devices 9a to 9n to be connected are of the type of analog signal inputs and of the type of two-way communication by using digital signals.

Although this embodiment shows the case where existing field devices to be connected are of the analog signal type and of the type of two-way communication by using digital signals, the operation of the virtual field apparatus 6 is considered to be the same in the viewpoint from the field bus side because the field apparatus 6 merely acts as a substitute for the existing field devices in the case where the existing field devices are of the analog current signal type.

In FIG. 2, a DC/DC converter 609 is supplied with a voltage from an external power supply through a transmission line so as to produces a voltage $V_{DD}$ for operating the field apparatus 6 and voltages Ea, Eb, . . . , En for operating analog signal receivers 612a, 612b, . . . , 612n so that the analog signal receivers 612a, 612b, . . . , 612n supply electric power to the field devices 8a to 8n which are not adapted to the field bus. Here, the DC/DC converter 609 controls the electric power supplied through the field bus 5 to keep the value thereof constant, so that the value of the electric power changes according to the number of the analog signal type field devices 8a to 8n to be connected.

The analog signal receivers 612a, 612b, . . . , are composed of power supply for supplying electric power to the respective field devices 8a to 8n not adapted to the field bus, and receivers for detecting analog current signals of 4 to 20 mA as the output signals from the respective field devices 8a to 8n. The output signals from the analog signal receivers are inputted, as analog signals of 1 to 5 V, into a multiplexer 610. The multiplexer 610 successively supplies those signals into the A/D converter 604 while successively switching the signals on the basis of the instruction supplied thereto from an I/O interface 605. The A/D converter 604 converts the signals into digital signals and a RAM 602 stores those digital signals. A microprocessor 601 controls the series of procedures described above on the basis of data programmed in a ROM 603.

Modems 613a, 613b, . . . , 613n are interface circuits for performing two-way communication by use of digital signals in a manner that the digital signals are superimposed on the analog signals of the existing field devices connected or that the analog signals are switched over into the digital signals. The digital signals are outputted as signals which are demodulated by the modems 613a, 613b, . . . , 613n selected by a multiplexer 611 on the basis of the instruction from the I/O interface 605 in order to send the output from a transmitter/receiver circuit 607 to the corresponding demodulators 613a, 613b, . . . , 613n. As the output signals from the modems 613a, 613b, . . . , 613n, for example, used are two kinds of frequency signals corresponding to digital signals "1" and "0" like frequency modulation, two kinds of phase signals corresponding to the two phases "1" and "0" like phase modulation, or the like. On the contrary, digital signals outputted from the existing field devices 8a to 8n are demodulated by the respective modems 613a, 613b, . . . , 613n and received through the transmitter/receiver circuit 607.

If modulated signals used in communication between the existing analog signal type field devices 8a to 8n and the field apparatus 6 are square wave signals having equal amplitude with respect to the positive and negative directions or sinusoidal wave signals having small amplitude, the influence on the analog signal receivers 612a, 612b, . . . , 612n can be avoided by performing communication while superposing the output digital signals on the analog signals.

The communication between the existing analog signal type field devices 8a to 8n and the field apparatus 6 is performed only when the necessity of performing communication with the analog signal type field devices 8a to 8n occurs, on the basis of communication with the field bus 5. The communication between the existing analog signal type field devices 8a to 8n and the field apparatus 6 is not used usually. When the communication is performed, the field apparatus 6 fulfills a role of protocol conversion between the field bus 5 and the existing analog signal type field devices 8a to 8n.

Also in the case of communication with the field bus 5, a modem 608 serves as an interface circuit for performing two-way communication with digital signals. The modem 608 sends a transmission signal as the output from the transmitter/receiver circuit 606 onto the field bus after coding treatment into Manchester code or the like. The reception signal from the field bus is decoded by the modem 608 and then the decoded signal is inputted into the transmitter/receiver circuit 606.

In the aforementioned configuration, the virtual field apparatus 6 has no decided address on the field bus, but addresses of the analog signal type field devices 8a to 8n connected are stored in the RAM 602. When the address coincides with the address in communication data from the field bus 5, the virtual field apparatus 6 performs processing of the analog signal type field devices 8a to 8n virtually. Because not only the output values from the analog signal type field devices 8a to 8n are periodically stored in the RAM 602 after A/D conversion by means of the A/D converter 604 but also the set values of the analog signal type field devices 8a to 8n are preliminarily stored in the RAM 602 by communication with the field bus 5, the field apparatus 6 performs substitution without communication with the analog signal type field devices 8a to 8n when transmission of the output values from the field bus 5 is requested. In the case where communication with the analog signal type field devices 8a to 8n is needed by the request from the field bus 5, the virtual field apparatus 6 fulfills a role of protocol conversion between the field bus 5 and the existing analog signal type field devices 8a to 8n as described above.

An embodiment in which field devices 9a to 9n not adapted to the field bus and connected to the virtual field apparatus 6 are of the analog signal input type will be described hereunder with reference to FIG. 3. In the same manner as in the embodiment of FIG. 2, the DC/DC converter 609 is supplied with a voltage from an external electric source through a transmission line so as to produce a voltage $V_{DD}$ for operating the field apparatus 6 and voltages Ea', Eb', . . . , En' for operating analog signal transmitters 615a, 615b, . . . , 615n so that the analog signal transmitters 615a, 615b, . . . , 615n supply electric power to the field devices 9a to 9n which are not adapted to the field bus. The analog signal transmitters 615a, 615b, . . . , 615n are constituted by electric source for supplying electric power to the field devices 9a to 9n not adapted to the field bus, and transmitters for sending analog circuit signals of 4 to 20 mA as the input signals to the field devices 9a to 9n. The input signals are inputted, as analog signals of 1 to 5 V, from the D/A converter 604 through the multiplexer 610. The switching signal of the multiplexer 610 is inputted from the I/O interface 605 on the basis of the instruction from the microprocessor 601. The analog signal transmitters 615a, 615b, . . . , 615n include sample-hold circuits and damping circuits respectively, so that the input value from the D/A converter 614 is updated when updating is requested from the field bus.

Communication with the analog signal input type field devices 9a to 9n and communication with the field bus 5 in this embodiment are quite the same as those described in the embodiment of FIG. 2.

Although FIGS. 2 and 3 respectively show the case where the existing field devices connected are of the analog signal output type and the case where the field devices are of the analog signal input type, the present invention can be applied to the case where the two examples of configuration are mixed with each other.

According to this embodiment, an effect arises in that existing analog signal type field devices and field devices adapted to a field bus can coexist on one control system. Another effect arises in that a field bus system can be attained simply by changing in minimum requirements.

As is obvious from the above description, an effect in that system transformation into a field bus system can be made while field devices used in an existing system and not adapted to a field bus are used continuously is attained by providing means for acting a substitute for the existing field devices on the field bus.

Further, not only the devices not adapted to the field bus can be exchanged to new ones adapted to the field bus easily by changing the connection thereof, but also the exchange to devices adapted to the field bus can be made without changing the settings of the other devices on the field bus. There arises an effect in that the control system can be transformed gradually.

What is claimed is:

1. A field bus system for performing signal transmission, through a field bus having a pair of transmission lines, between a plurality of field devices which detect physical amounts at a field side of said transmission lines and at least one higher-rank apparatus which monitor said field devices at a higher-rank apparatus side of said transmission lines, said higher-rank apparatus being connected to said transmission lines at said higher-rank side of said transmission lines, said higher-rank apparatus being a digital signal type higher-rank apparatus which performs communication using digital signals on said transmission line, wherein said field devices to be connected to said transmission lines includes at least one digital signal type field device whose input and output signals are digital signals, and at least one analog signal type field device whose input and output signals are analog signals, said system comprising:

substitution processing means, connected between said analog signal type field device and said transmission lines at said field side of said transmission lines, for processing an analog signal of said analog, signal type field device, mutually converting between an analog signal to be input to or output from said analog signal type field device and a digital signal on said transmission lines to thereby act as a substitute for said analog signal type field device, and performing communication between said analog signal type field device and said digital signal type higher-rank apparatus using digital signals.

2. A field bus system according to claim 1,
wherein said analog signal type field device has a function for performing said communication by using a digital signal superposed on an analog signal, and wherein said substitution means includes means for modulating and demodulating said digital signal to thereby perform said communication between said analog signal type field device and said higher rank apparatus, and means for transmitting and receiving said analog signal from said analog signal type field device.

3. A field bus system according to claim 1, wherein said analog signal type field device has a function for time-divisionally processing an analog signal and a digital signal, and wherein said substitution means includes means for modulating and demodulating said digital signal to thereby perform said communication between said analog signal type field device and said higher rank apparatus, and means for transmitting and receiving said analog signal from said analog signal type field device.

4. A field bus system according to claim 1, further comprising:

a plurality of said analog signal type field devices; and
wherein said substitution means comprises means for successively switching communication with said plurality of said analog signal type field devices, means for performing signal conversion between an analog signal and a digital signal from any one of said plurality of said analog signal type field devices, means for storing the digital signal subjected to the signal conversion, and means for controlling said storing means.

5. A field bus system according to claim 4, wherein said storage means as part of said substitution means stores setting values related to and addresses of said respective analog signal type field devices, and wherein said higher-rank apparatus acts to change said setting values and to designate said analog signal type field devices on the basis of said addresses respectively.

6. A field bus system according to claim 1, wherein said substitution means includes electric power conversion means for receiving electric power and converting said electric power into power for said system and into power for respective analog signal type field devices.

7. A virtual field apparatus for conducting communication by using digital signals between field devices including at least one digital signal type field device which detects physical amounts at a field side and whose input/output signals are digital signals and analog signal type field devices whose input/output signals include analog signals, and a higher-rank apparatus which monitors said field devices via a pair of transmission lines, said analog signal type field devices being connected to said transmission lines via said virtual field apparatus, said virtual field apparatus comprising:

a digital signal connection terminal connected to said transmission lines;

a plurality of analog signal connection terminals respectively connected to said analog signal type field devices; and conversion means for performing signal conversion between a signal including an analog signal which is inputted or outputted at each of said analog signal connection terminals and a communication signal which is inputted or outputted at said digital signal connection terminal.

8. A virtual field apparatus according to claim 7, further comprising:

a storage which stores the communication signal corresponding to each of said analog signal connection terminals; and a communication controller which controls communication of the signals stored in said storage between said storage and said digital signal connection terminal.

9. A virtual field apparatus according to claim 8, wherein said storage means acts to store addresses for indicating apparatuses connected to said analog signal connection terminals, and wherein said control means controls the reading/writing of the digital signals of the corresponding apparatuses stored in said storage means in accordance with address designation from said digital signal connection terminal.

* * * * *